United States Patent [19]

Arney

[11] Patent Number: 4,966,099

[45] Date of Patent: Oct. 30, 1990

[54] PET FEEDER AND METHOD FOR FEEDING

[76] Inventor: James R. Arney, P.O. Box 1646, Hemphill, Tex. 75948

[21] Appl. No.: 290,308

[22] Filed: Dec. 27, 1988

[51] Int. Cl.$^5$ .............................................. A01K 5/01
[52] U.S. Cl. .................................. 119/61; 43/122; 43/132.1
[58] Field of Search .................. 119/18, 51 S, 51 R, 119/52 R, 61, 62, 63, 72, 77; 43/69, 122, 124, 132.1, 109; D30/129, 130

[56] References Cited

U.S. PATENT DOCUMENTS

| | | | |
|---|---|---|---|
| D. 53,390 | 5/1919 | Wolskl et al. | 119/51 R |
| D. 76,406 | 9/1928 | Leon | 119/18 |
| 1,552,076 | 9/1925 | Mosier | 119/61 |
| 1,575,101 | 3/1926 | Edwards | 119/18 |
| 1,855,314 | 4/1932 | Schacht | 119/61 |
| 2,356,022 | 8/1944 | Wright | 43/109 |
| 2,584,301 | 2/1952 | Sinclair | 43/109 |
| 2,591,459 | 4/1952 | Meany | 119/51 R |
| 2,941,502 | 6/1960 | Pusey | 119/1 |
| 3,202,131 | 8/1965 | Jones | 119/61 |
| 4,007,711 | 2/1977 | Michael | 119/62 X |
| 4,389,975 | 6/1983 | Fisher, Jr. | 119/51 R |
| 4,399,772 | 8/1983 | Salinas | 119/51.5 |

FOREIGN PATENT DOCUMENTS 2944890 5/1981 Fed. Rep. of Germany ........ 119/72
16409 of 1910 United Kingdom .................. 43/109

Primary Examiner—John Weiss
Attorney, Agent, or Firm—Harold H. Dutton, Jr

[57] ABSTRACT

A pet feeder comprising a base member, an upstanding support rod having one end secured to the base member, a disk-like support plate secured to the other end of the support rod, a liquid receptacle secured to the support rod intermediate the ends thereof; the support plate has a plurality of radially spaced openings therein; a pet food dish having a plurality of depending feet spaced and arranged so as to be engagable with the openings in the support plate is provided, and each of the feet have an enlargement thereon for retaining the feet in the openings in the support plate; the food dish has a diameter slightly greater than the diameter of the support plate so as to extend radially beyond the edge of the support plate; placing corn oil in the liquid receptacle prevents ants and other crawling insects from reaching the support plate and/or the food dish secured thereon.

8 Claims, 2 Drawing Sheets

PET FEEDER AND METHOD FOR FEEDING

BACKGROUND AND OBJECTS OF THE INVENTION

This application relates to a pet food dish and a support therefor, and an insect-free method for feeding pets. More particularly, the invention relates to an improved food dish intended for feeding dogs, and a method for feeding dogs so as to avoid ant infestation of food.

In the past, many different types of pet food dishes have been provided, but with a number of different drawbacks. Some prior food dishes are easily turned over by the pet or other animal, while other dishes allow crawling insects such as ants to get to the food in the dish. For such reasons, the prior art dishes have not gained widespread acceptance, and the most commonly used pet food dish is simply a bowl that contains the food.

In some parts of the country, where climates tend to be warmer, dogs are kept outdoors most of the year, but because of the climate, insects tend to proliferate. For this reason, when a conventional dish is used to feed a dog, ants tend to congregate around the pet food dish, making for an unsanitary and unhealthy condition for the pet. In many cases, the dogs must compete with the insects for the food.

One prior art attempt to overcome this problem is shown in U.S. Pat. No. 4,357,905 to Carpenter. This patent s a pet food dish which also contains water for the pet. The water forms a moat around the food dish so that in theory, the insects will not be able to reach the food. However, a problem with this type of feeder is that often the food will fall into the moat, either by the dog or when filling the dish, with the result that ants enter the moat, and then the food dish.

Another prior art feeder is known from U.S. Pat. No. 3,441,003 to DuMond, et al, and provides a lower dish which contains an annular receptacle filled with an insecticide, and an upper receptacle filled with the food. However, such an arrangement places the food in close proximity to the food, increasing the likelihood that the pet would ingest some of the insecticide, particularly if the dish were turned over by the dog.

Still another prior device is shown in U.S. Pat. No. 2,677,350 to Prestidge, et al, and provides a moat filled with an insecticide surrounding the food dish. The theory here is that the moat is only large enough for ants to enter, but not the pet. However, any rain would flush the insecticide out of its moat and onto the surrounding ground.

U.S. Pat. No. 4,128,080 to Haney discloses another animal feeder which has a wide base filled with water, and an upstanding post in the middle for supporting a food dish. The theory here again is that the water will keep the ants out of the food. However, this of course requires that the dish be filled at all times, while in reality, a pet drinks much water in warm weather, and evaporation causes a lot of water to leave the dish, and a dry or empty dish will readily allow ants to access the food dish. This same problem can also occur with some of the other prior art dishes referred to above.

The use of any conventional insecticide can present some inherent hazards to the animal or the pet owner, and even to the environment if the insecticide is spilled, such that the prior devices which use insecticides are simply not practical for safe use.

Some prior types of supports have included the use of an insecticide along with an elevated platform for food, such as in U.S. Pat. No. 533,017 to Peeler, but there is a great likelihood that a dog will upset such a device, whereby the food will be contaminated with the insecticide.

A further problem with the prior art pet food dishes resides in the problems associated with cleaning of the dishes. Certainly the pet food dishes must be washed regularly, but a large, cumbersome device leads to practical problems. For example, a large device might not fit into a standard dishwasher, with the result that the dish would not be washed as often as it should. Further, the complexities of some of the prior devices make it difficult to clean the device thoroughly.

These drawbacks in the prior art pet feeders have spawned may efforts, but no complete solutions to the problems mentioned.

The present invention seeks to overcome the drawbacks of the prior art devices, and the primary object of this invention is to provide a unique pet feeder which solves most of the problems with the prior art feeders.

Another object of the invention is to provide a method for feeding pets such as dogs so as to keep ants and other insects away from the food.

A further object of the invention is to provide an improved pet feeder which is easily cleaned, sturdy and not likely to be turned over.

Yet another object of the invention is to provide a pet feeder which prevents ants and other crawling insects from reaching the food therein.

Still another object of the invention is to provide a pet feeder which includes an upright support and a feed dish removably attached thereto.

Still a further object of the invention is to provide a pet food dish which includes a receptacle for a safe, nontoxic ant and insect barrier liquid.

DESCRIPTION OF THE INVENTION

The present invention provides a ground engaging base member having a central, internally threaded bore extending upwardly from an integral boss. The bore receives a threaded post which extends upwardly from the base member. A cup-like receptacle having a central, threaded opening is threadedly mounted on the post, near the mid-point of the post. At the upper, threaded end of the post is attached a generally disk-like support plate. The support plate includes a plurality of openings therein.

A food receptacle is provided with a plurality of depending feet thereon which are spaced on the bottom of the receptacle so as to coincide with the openings in the support plate. The feet have enlargements at the lowermost portions thereof, the enlargements being slightly larger than the diameter of the openings in the support plate, such that the food dish must be pushed downwardly so that the enlargements and the feet pass into the openings on the support plate for locking the food dish to the support plate.

The cup-like receptacle is filled with either corn oil or vegetable oil to a depth of about an inch. I have found that such an oil effectively prevents ants from passing from below the cup up to the plate like member or the food dish. Further, either type of oil is safe and non-toxic, both to the animals and to the environment, so that in the event of an accidental spill, no damage is caused. While the feeder itself helps to keep any rainwater out of the cup, even if water should enter the cup, the oil remains on the surface, maintaining its effectiveness at keeping ants from the food.

The food dish itself may be easily removed from the support for cleaning, but is still securely attached, even if the dog should turn the entire device over.

The support plate serves as an 'umbrella' to keep rain water out of the oil cup, but also includes a central opening by which the pet owner can check on the level of the oil in the cup or add more oil if needed.

The base member includes means by which the entire device may be secured to the ground, or to any other base, such as a large board or the floor of a dog house.

DESCRIPTION OF THE DRAWINGS

These and other objects and advantages of the invention will become apparent from a detailed consideration of the specification and claims which follow, when considered with the accompanying drawings, in which:

DETAILED DESCRIPTION OF PREFERRED EMBODIMENTS

Figure 1:
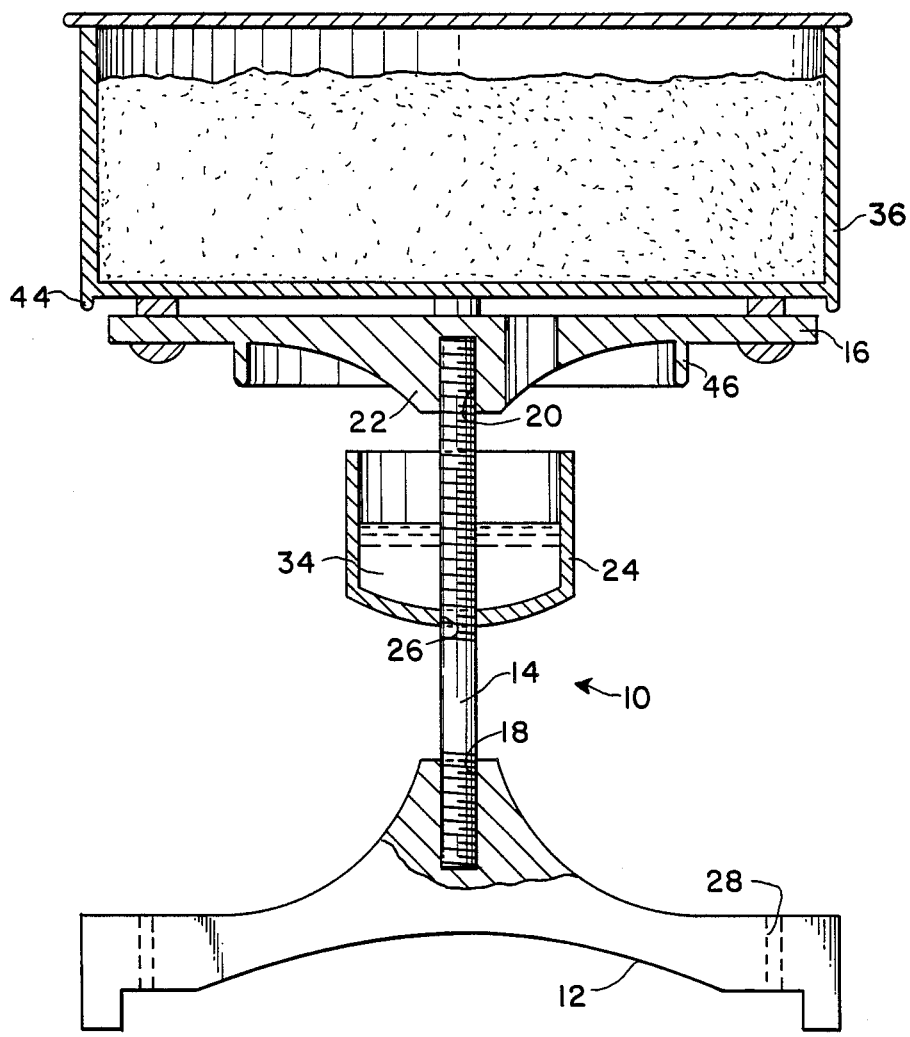
FIG. 1 is a longitudinal sectional view of a pet feeder according to the invention.

The invention will now be described in greater detail with reference to the accompanying drawings. The pet feeder is generally designated 10 in FIG. 1 and is seen to include a base member 12, a threaded support rod 14 and a disk-like support plate 16. The base member 12 includes a central, threaded aperture 18 into which the support rod 14 is threadedly engaged. At the upper end of the support rod 14, the rod threadedly engages a threaded aperture 20 formed in a depending boss 22 on the underside of the support plate 16.

Between the base member 12 and the support plate 16, a cup-like liquid receptacle 24 having a central threaded aperture 26 is threaded onto the support rod 14. The receptacle 24 is open at the top.

The base member 12 is seen to have at least one aperture 28, and a typical screw (not shown) may pass through this aperture 28 for securing the device to any suitable base such as the ground, a board, or the floor of a dog house.

Figure 2:
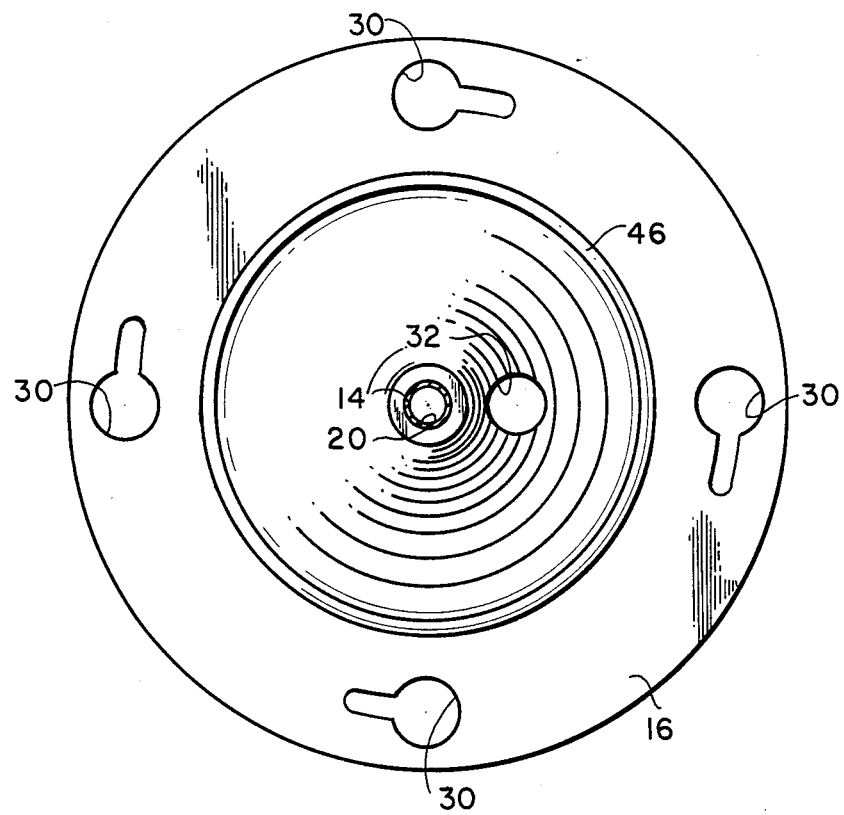
FIG. 2 is a bottom plan view of the support plate.

As best seen in FIG. 2, the support plate is provided with a plurality of radially spaced openings such as the keyhole shaped openings 30 shown. These openings are used for securing a food dish to the support plate. An additional opening 32, slightly offset from the central opening 20 is provided, and is positioned such that it will overly the liquid receptacle 24. A suitable non-toxic, food grade oil may be poured through this opening 32 in order to fill the receptacle 24 with oil, as indicated at 34. After filling, the hole serves to allow inspection of the liquid level in the receptacle 24.

Figure 3:
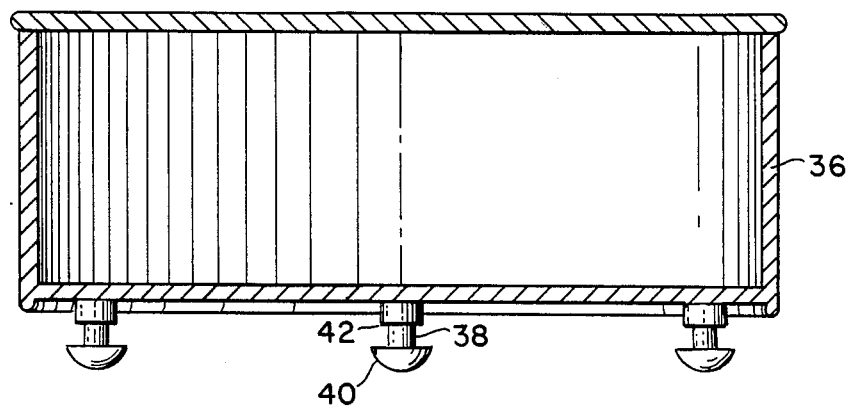
FIG. 3 is a longitudinal cross sectional view of the food dish used with the support.

The food dish 36 shown in FIGS. 1 and 3 is seen to include a plurality of depending feet 38. The feet are equal in number to the number of apertures 30 in the support plate 16 and equally spaced. The feet include an enlarged head portion 40 and an enlarged spacer portion 42. The spacer portion serves to keep the food dish spaced from the support plate 16. The dish is placed onto the support plate 16 with the feet 38 aligned with the apertures 30, and upon pushing the food dish downwardly, the enlarged heads 40 enter the apertures 30.

The food dish 36 may then be rotated slightly with respect to the support plate 16 so that the feet 38 move into the smaller portion of the apertures 30, for locking the food dish to the support plate.

Preferably, the food dish 36 is of a slightly greater diameter than the support plate 16, so that the sides of the food dish 36 extend slightly beyond the edges of the plate 16 as seen in FIG. 1. This helps to ensure that any food or rain water will not enter the oil receptacle 24. Desirably, a molded skirt 44 depends from the edges of the walls of the food dish which causes any drops of water to fall to the ground.

In some cases, a further skirt 46 may depend from the underside of the support plate 16. This skirt 46 will help to ensure that the pet cannot get access to the oil contained in the receptacle 24.

To test the "ant-proof" nature of the invention, I placed the device outside with pet food in the dish 36, over an ant hill. After a period of time, ants had reached the pet food. I then filled the receptacle with corn oil and removed the food dish. After a period of time, the ants that were above the receptacle had all returned downwardly and were trapped in the oil. No live ants were observed above the oil cup, although many ants were crawling around the base. Thus, the oil cup served as a very effective barrier to ants, with no toxic or harmful effects. Further, the device was quite stable even without securing to the ground, although for large dogs, the ground anchoring would be preferable.

The food dish may be easily removed from the support plate for cleaning, even when the base is anchored as described above, thus maintaining a sanitary feeding condition for pets. The food grade oil is non-toxic, both to the pets and to the environment, but is extremely effective in preventing ants from reaching the food.

While this invention has been described as having certain preferred features and embodiments, it will be understood that it is capable of still further variation and modification without departing from the spirit of the invention, and this application is intended to cover any and all variations, modifications and adaptations of the invention as fall within the spirit of the invention and the scope of the appended claims.

I claim:

1. A pet feeder comprising a base member, an upstanding support rod having one end secured to the base member, a disk-like support plate secured to the other end of said support rod, a liquid receptacle secured to said support rod intermediate the ends thereof; said support plate having a plurality of radially spaced openings therein; a pet food dish having a plurality of depending feet spaced and arranged so as to be engagable with the openings in said support plate, each of said feet having an enlargement thereon for retaining said feet in said openings in said support plate; said food dish having a diameter slightly greater than the diameter of said support plate so as to extend radially beyond the edge of said support plate.

2. A pet feeder as in claim 1 and including a non-toxic food grade oil in said liquid receptacle.

3. A pet feeder as in claim 2 and wherein said food dish includes an integral depending skirt portion radially beyond said support plate.

4. A pet feeder as in claim 3 and wherein said base member includes aperture means for securing said base member to a subjacent surface.

5. A pet feeder as in claim 4 and wherein said feet space said food dish from said support plate.

6. A pet feeder as in claim 5 and wherein said support plate includes an inspection/oil-fill hole therethrough above said liquid receptacle.

7. A method for feeding pets for keeping ants and other crawling insects out of the pet food comprising providing a pet feeder including a base member, an upstanding support rod having one end secured to the base member, a disk-like support plate secured to the other end of said support rod, a liquid receptacle secured to said support rod intermediate the ends thereof; said support plate having a plurality of radially spaced openings therein; a pet food dish having a plurality of depending feet spaced and arranged so as to be engagable with the openings in said support plate, each of said feet having an enlargement thereon for retaining said feet in said openings in said support plate; providing a liquid food grade oil in said liquid receptacle; and placing pet food in said food dish; whereby said food grade oil in said receptacle prevents ants from climbing from the ground to said food.

8. A method as in claim 7 and wherein said oil is selected from the group consisting of corn oil and vegetable oil.

* * * * *